No. 737,996. PATENTED SEPT. 1, 1903.
D. B. BULLARD.
LATHE.
APPLICATION FILED AUG. 5, 1901.
NO MODEL. 11 SHEETS—SHEET 6.

Witnesses
Charles A. Safford
F. Brainard Smith

Inventor
Dudley B. Bullard
by Hubert J. Bullard
Attorney

No. 737,996. PATENTED SEPT. 1, 1903.
D. B. BULLARD.
LATHE.
APPLICATION FILED AUG. 5, 1901.
NO MODEL. 11 SHEETS—SHEET 8.

Witnesses
Charles A. Safford
F. Brainard Smith

Inventor
Dudley B. Bullard
by Hubert V. Bullard
Attorney

THE NORRIS PETERS CO., PHOTO-LITHO., WASHINGTON, D. C.

No. 737,996. PATENTED SEPT. 1, 1903.
D. B. BULLARD.
LATHE.
APPLICATION FILED AUG. 5, 1901.
NO MODEL. 11 SHEETS—SHEET 9.

Witnesses
Charles A. Lafford
G. Brainard Smith

Inventor
Dudley B. Bullard
by Hubert S. Bullard,
Attorney

No. 737,996. PATENTED SEPT. 1, 1903.
D. B. BULLARD.
LATHE.
APPLICATION FILED AUG. 5, 1901.
NO MODEL. 11 SHEETS—SHEET 10.

Witnesses
Charles A. Safford
F. Brainard Smith

Inventor
Dudley B. Bullard
by Hubert S. Bullard
Attorney

No. 737,996. PATENTED SEPT. 1, 1903.
D. B. BULLARD.
LATHE.
APPLICATION FILED AUG. 5, 1901.
NO MODEL. 11 SHEETS—SHEET 11.

No. 737,996. Patented September 1, 1903.

UNITED STATES PATENT OFFICE.

DUDLEY B. BULLARD, OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

LATHE.

SPECIFICATION forming part of Letters Patent No. 737,996, dated September 1, 1903.

Application filed August 5, 1901. Serial No. 70,840. (No model.)

*To all whom it may concern:*

Be it known that I, DUDLEY B. BULLARD, a citizen of the United States, residing at Bridgeport, in the county of Fairfield and State of Connecticut, have invented certain new and useful Improvements in Lathes, of which the following, taken in connection with the accompanying drawings, is a specification.

My invention relates to improvements in the class of machines known as "turret-lathes," in which several turret-tools supported in a revoluble turret-head are successively brought into working position and fed predetermined distances and at speeds readily changed.

The objects of my invention are to provide a quick method of unlocking the turret-head, so as to permit its revolution and the consequent swinging of a new tool into operative position and of securely relocking it in its new position, to provide a mechanism for throwing the feed out of action after each tool has traveled a predetermined distance, and to provide a method for conveniently feeding the carriage by hand while the tool is cutting.

In the drawings.

On the various plates like reference-numbers refer to identical parts.

Figure 1:
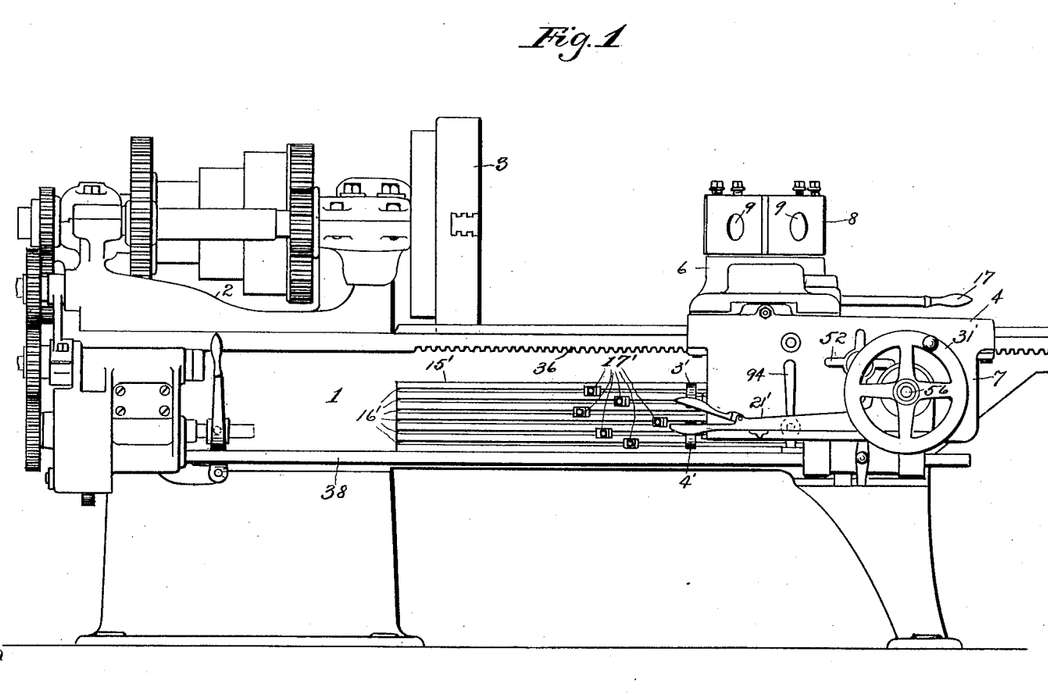
Figure 1 is a front elevation of a turret-machine provided with a headstock and face-plate on the left-hand end and a turret-carriage on the right-hand end.
Figure 2:
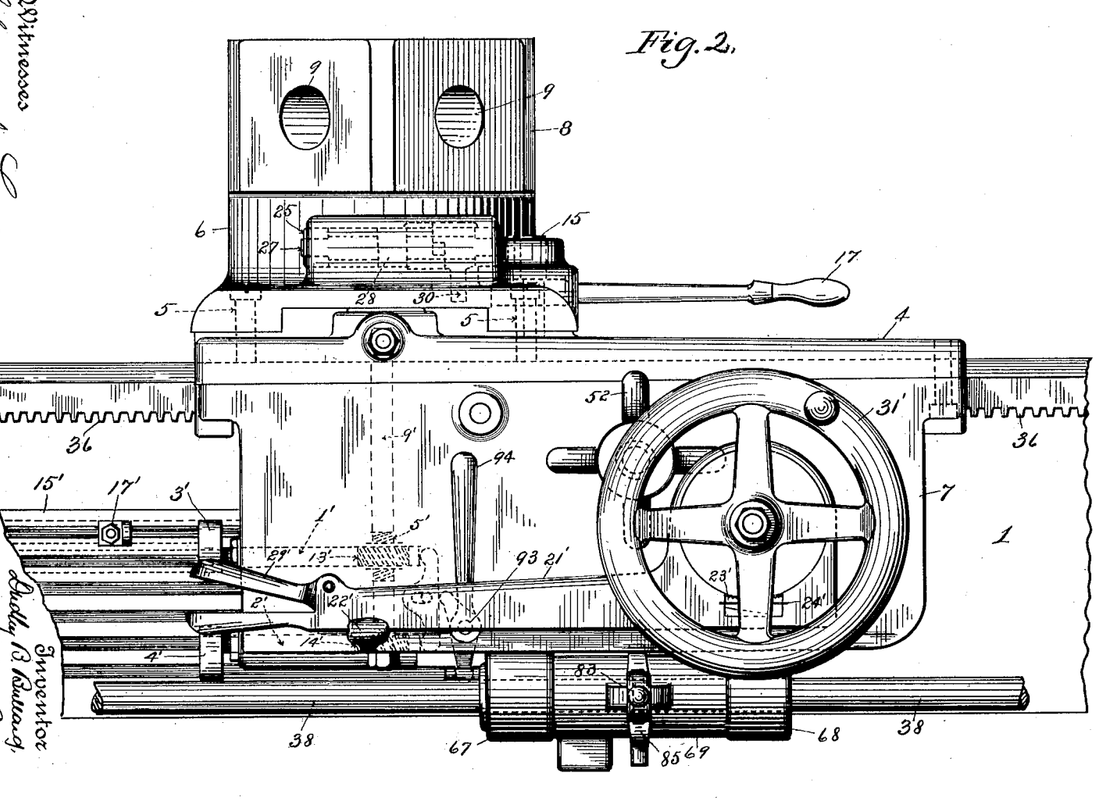
Fig. 2, an enlarged front view of the turret, slide, and apron.

1 is a lathe-bed, which supports at its left-hand end a head-stock 2, provided with either a face-plate 3 or a chuck, depending upon the character of work to be performed, and at its right-hand end a movable carriage 4, to which a carriage-block 6 is secured by means of screws 5 5 and from which an apron 7 is suspended. Revolubly mounted on said carriage-block is a hexagonal turret 8, provided with six tool-holding apertures 9 and a cylindrical hub 10, projecting downward into said block.

Figure 3:
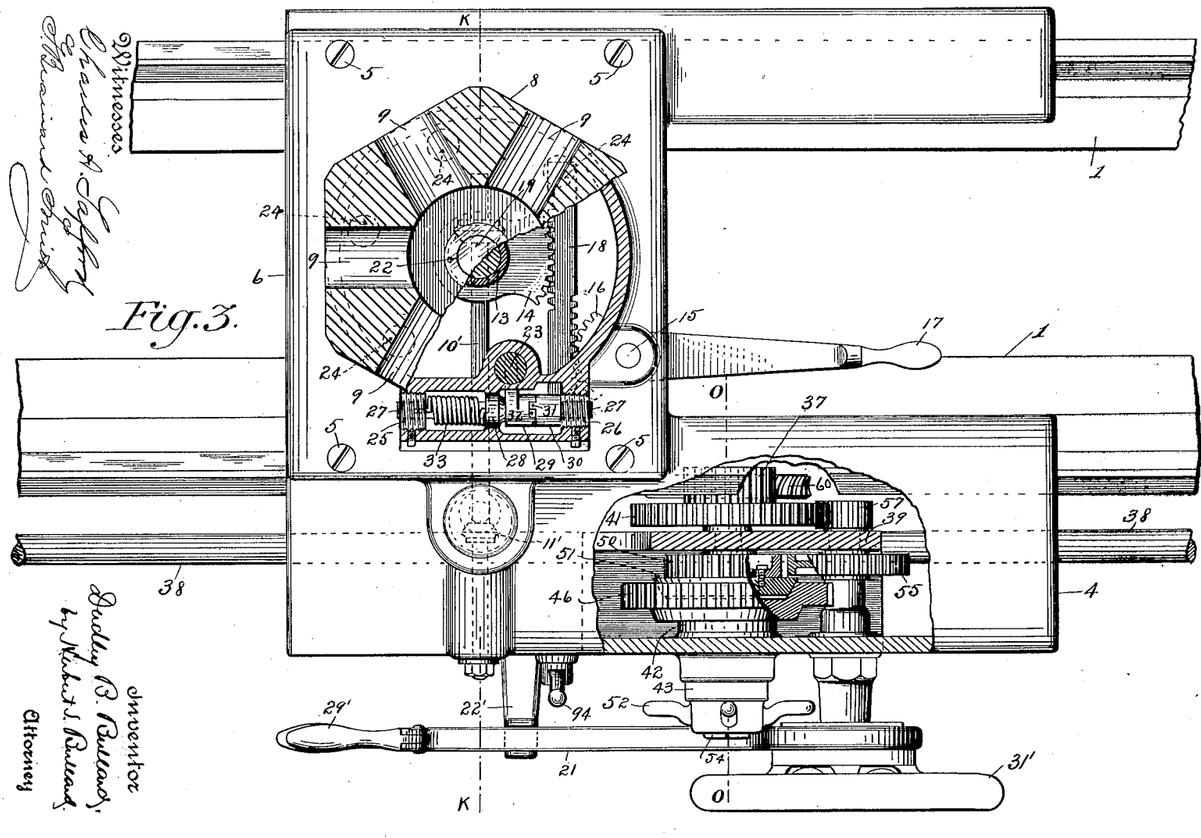
Fig. 3, a plan view of the same with certain portions so cut away as to reveal the internal mechanism by which the turret-head is unlocked and also the apron-gearing for feeding the carriage forward or backward.
Figure 6:
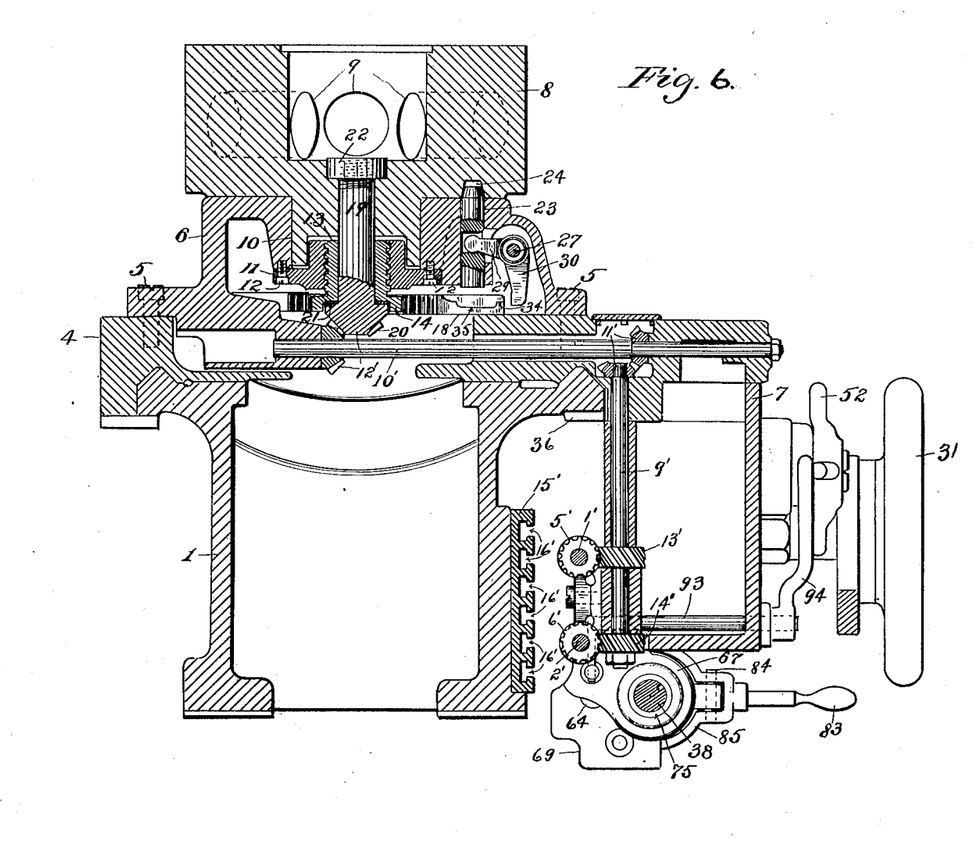
Fig. 6, a transverse section on the line K K of Fig. 3.

11, Fig. 6, is a stationary nut securely fastened to the carriage-block by the screws 12 12. Entering said nut is a binding-screw 13, with its lower portion so flanged as to form a segment-gear 14. Centered on the pin 15, Fig. 3, is a second segment-gear 16, operated by the lever-handle 17. 18 is a double-toothed rack adapted to move transversely in said carriage-block and meshing with said segment-gears. Passing through the center of the turret and the binding-screw is a binding-stud 19, Fig. 6, the lower end of which is formed into a broad-shouldered miter-gear 20, which supports a bronze ring 21, and on the upper end of which is a broad-shouldered nut 22. Said stud is keyed to the turret-head, and therefore revolves with it. The turret is securely locked against possible revolution by means of a taper-headed lock-pin 23, bedded vertically in the carriage-block and projecting upward into a taper recess 24 of the turret-head. The under side of the turret-head is provided with six such recesses, so arranged with reference to the taper pin that as the tools of the turret-head are successively brought into working position opposite the head-stock face-place a taper recess will always be directly above the taper pin.

Figure 7:
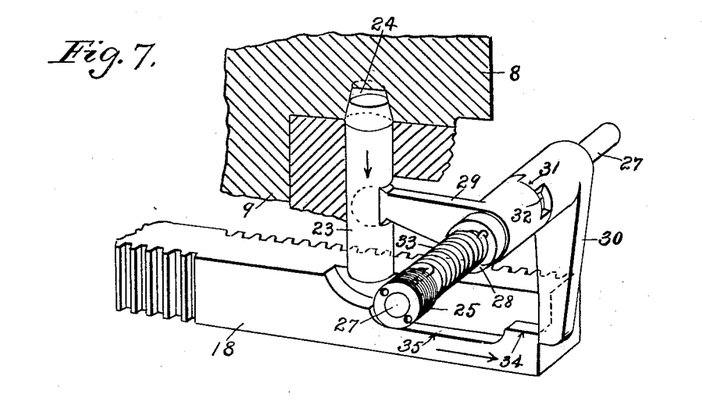
Figs. 7, 8, and 9, various positions of the turret lock-pin and two-part bell-crank extractor during the operation of unlocking, revolving, and relocking the turret.

25 and 26, Figs. 3 and 7, are screw-bushings which support a revoluble rod 27, turned with a collar 28. On the right of the collar is a two-part bell-crank composed of arm 29, which is keyed to the shaft and projects into a slot of the taper pin, and arm 30, which revolves loose upon the shaft and projects downward opposite the end of rack 18. Arm 30 is provided on its left-hand vertical face with a tooth 31, which projects into a recess 32 on the right-hand vertical face of arm 29.

33 is a torsional spring, one end of which is securely attached to collar 28 and the other end to bushing 25, which latter may be screwed in or out of the carriage-block by a spanner-wrench and the tension of the spring thereby increased or diminished. Said spring, acting through arm 29 of the bell-crank, constantly forces the taper pin 23 upward.

Figure 8:
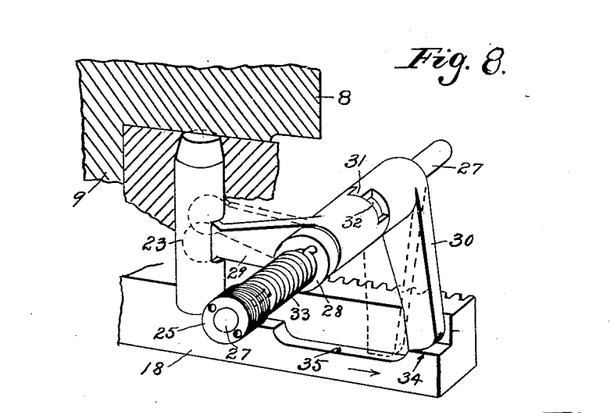
Figure 9:
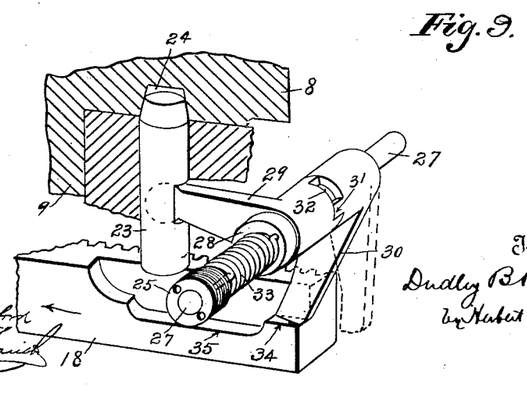

The operation of the binding and unlocking mechanism is as follows: As the handle 17 is thrown back toward the center of the machine the segment-gear 16 revolves on pin 15 and draws the rack-bar 18 forward, thereby causing the segment-gear 14 to revolve toward the front of the machine and the binding-screw 13 to enter the binding-nut 11. This immediately releases the tension on binding-stud 19, by means of which the turret-head was firmly clamped to the carriage-block. By the time the binding-screw 13 has entered its nut sufficiently far to release said tension the end of rack 18 has come in contact with arm 30 of the bell-crank, Fig. 7. A continued backward motion of the lever 17 therefore causes the arm 30 to revolve on its center, but being securely locked by projecting tooth 31 to arm 29 the taper lock-pin 23 is depressed against the torsion of spring 33. The operator now revolves the turret-head upon its center by means of his left hand and continues his backward pressure upon lever-handle 17 by means of his right hand, which causes taper recess 24 to revolve out of alinement with taper pin 23 and the arm 30 to drag along the flat surface 34 of the rack 18, as shown in Fig. 8. On the continued backward movement of lever 17 the arm 30 travels off surface 34 of the rack into depression 35 and drops, by virtue of length of recess 32 of arm 29, into which tooth 31 projects, into the normal or vertical position shown in the dotted lines, Fig. 8. The taper pin at the moment the arm 30 drops off surface 34 jumps upward under pressure of torsion-spring 33 and rests against the revolving surface of the turret-head, prepared to enter the approaching taper recess as soon as it is revolved into proper alinement. When the new tool is swung into working position on the center line of the machine, the desired alinement of taper pin and recess is established, and the taper pin springs upward into said recess and securely locks the turret against further revolution, and arm 29 takes the position shown by the dotted lines, Fig. 8. The operator thereupon draws the lever 17 toward him, which forces the rack 18 backward, and the lever 30, by virtue of the relative positions of the tooth 31 and recess 32, revolves to the left and rests on surface 34 until it drops off and assumes the normal position shown in the dotted lines, Fig. 9. The continued forward motion of the lever 17, transmitted through segment-gear 16 to rack 18, and thus to segment-gear 14, causes the binding-screw 13 to recede from its nut 11, thereby restoring the tension upon stud 19 and securely clamping the turret to the carriage-block.

Figure 10:
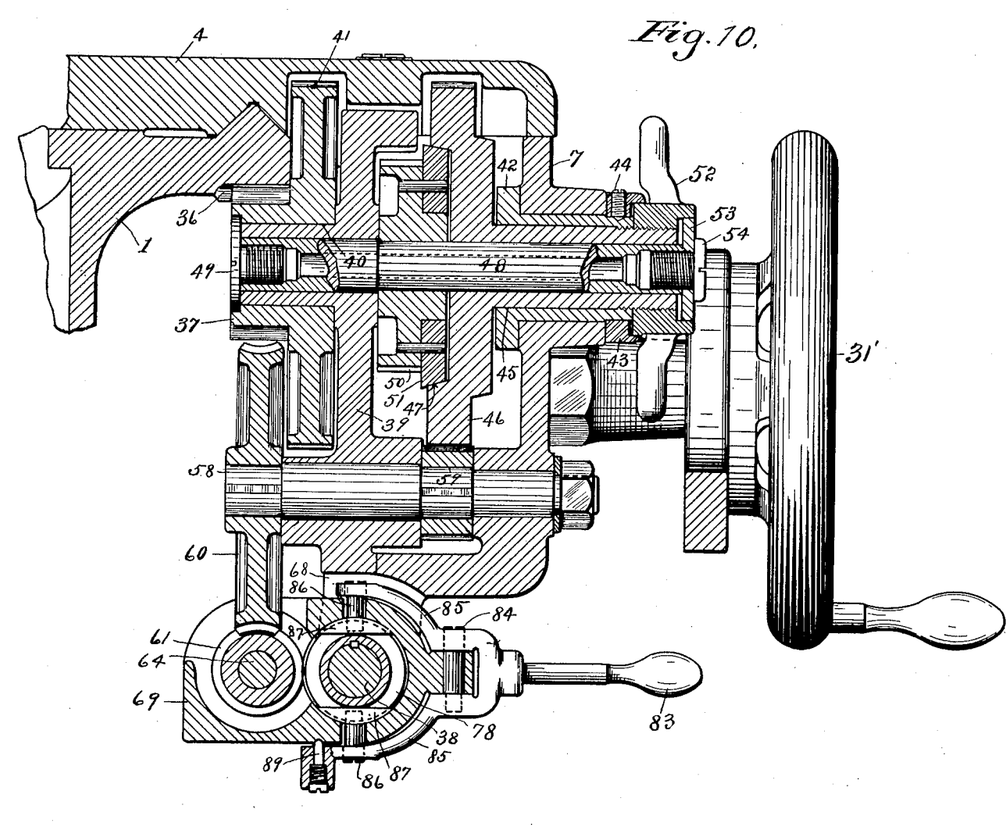
Fig. 10, a section on lines O O of Fig. 3, showing a portion of the train of gears by which the revolutions of the feed-rod are transmitted to the rack-pinion and the carriage caused to travel backward or forward, according to the direction of revolution of the worm.

The carriage is fed along the bed by means of a rack and pinion 36 37, Fig. 10, the latter being operatively connected by the following-described train of gearing to a splined feed-rod 38, Figs. 1 and 10, which in turn is operatively connected to the spindle of the head-stock by means of spur-gearing situated at the left-hand end of the machine, Fig. 1. 39, Fig. 10, is a bracket firmly secured to said apron and possessing a cylindrical projection 40, on which revolve pinion-gear 37 and gear 41, shown in the drawings as made of one casting.

42 is a hollow-shouldered bushing inserted in the carriage-apron and held against longitudinal movement by collar 43 and set-screw 44 and through which projects the stem 45 of a friction-gear 46, having a tapered depression 47. The end of said stem is threaded with a right-handed screw and supports a hand-nut 52. Passing through the latter gear and cylindrical projection 40 of bracket 39 and free to revolve therein is a steel stud 48, which is held against longitudinal movement by means of a broad-headed screw 49 and the hub of spur-gear 50. The latter is pressed upon and revolves with said stud and has pinned to its outer face a friction-ring 51, opposite to and of the same diameter as the tapered recess 47 of gear 46. The outer end of stud 48 is supplied with a ring 53, held in place by a screw 54, the function of which is to furnish a shoulder against which hand-nut 52 presses when screwed to the left, which causes friction-gear 46 to travel backward and into frictional contact with friction-ring 51. To release the friction-gear, the operator has but to give the hand-nut 52 a quick turn to the right, thereby causing it to travel along stem 45 until it strikes the bushing 42, which causes the friction-gear to travel forward and out of contact with the friction-ring 51. Gear 50 meshes with gear 55, Figs. 3 and 15, which is keyed to a shaft 56, supported by and capable of revolving in bearings formed by bracket 39 and apron 7, and carries at its inner end the pinion 57, meshing with gear 41, and at its outer end the hand-wheel 31′, Fig. 3. Any rotation of the hand-wheel 31′ is therefore transmitted to the rack-pinion, and likewise any rotation of gear 50, if in frictional contact with gear 46, is also transmitted to the rack-pinion.

Figure 11:
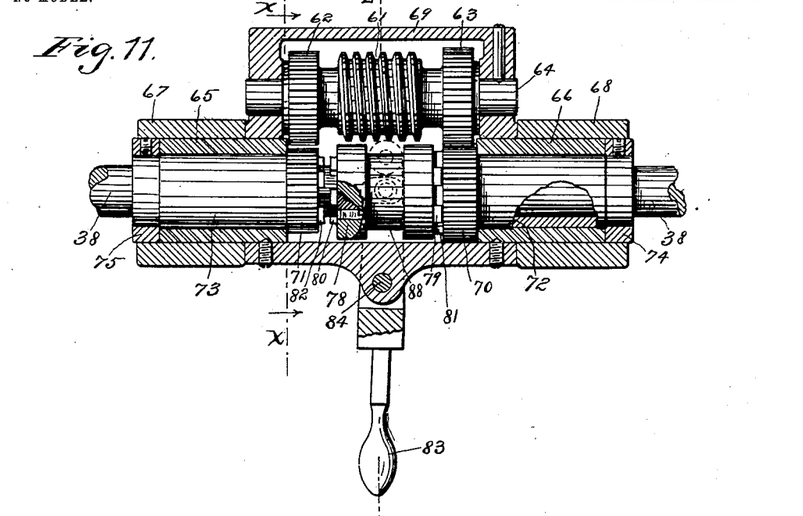
Fig. 11, a plan view of the feed-rod clutch and worm with the non-revoluble parts sectioned.
Figure 12:
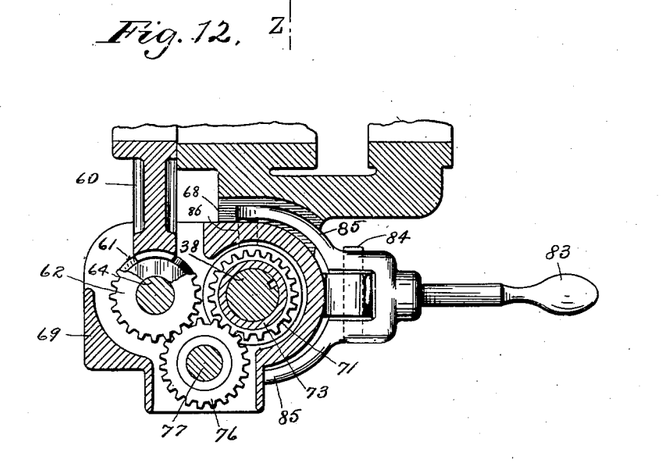
Fig. 12, a section of the same on the line X X of Fig. 11 looking in the direction of the arrows, showing the worm and worm-gear in driving contact.
Figure 13:
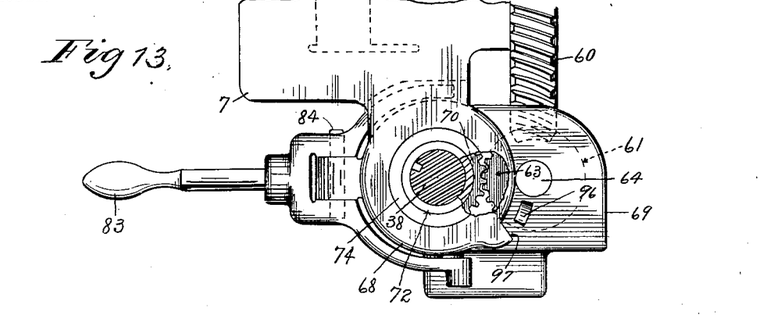
Fig. 13, a right-hand end view of Fig. 11 when the worm and gear are in contact.

58 is a third stud supported by and revoluble in bearings furnished by bracket 39 and apron 7 and has keyed to its central portion a pinion 59, meshing with gear 46, and to its inner end a worm-gear 60, meshing with a worm 61. Said worm has a gear 62, Fig. 11, cut upon its left-hand end and a gear 63 upon its right-hand end and revolves loosely upon a stud 64, inserted in a rocker-bracket 69, the trunnions of which are formed of bushings 65 and 66 and are supported in cylindrical projections 67 and 68 of the apron. Free to revolve in said trunnions are gears 70 and 71, with hollow sleeves 72 and 73, which are held in place by collars 74 and 75. Gears 63 and 70 mesh with one another; but between gears 62 and 71 is placed an intermediate gear 76, Fig. 12, revolving on a stud 77, driven into the rocker-bracket.

78 is a clutch-sleeve keyed to the splined feed-shaft 38 and has cut upon its right and left rims a set of clutch-teeth 79 and 80, which are capable of being locked with a corresponding set of teeth 81 82 upon gear-bushings 72 and 73. The clutch may be thrown to the left or right by means of a two-forked handle 83, swiveled upon pin 84, the upper and lower forks of which, 85 85, project by means of pins 86 86 and segment-pieces 87 87 into groove 88 of the clutch. If the clutch is thrown to the left, the intermediate gear 76 will come into play and the worms will revolve in the same direction as the feed-rod. If the clutch is thrown to the right, gears 63 and 70 come into play and the worm revolves in an opposite direction to that of the feed-rod. It is therefore evident that by shifting the handle 83 to the left or right the carriage may be fed forward or backward on the lathe-bed at the option of the operator. For the purpose of locking said handle in any one of its three positions—that is, with the clutch out of gear or thrown into gear to the right or left—the lower fork 85 is supplied with a spring-pin 89, which projects into depression in the rocker-bracket directly above where the pin lies when the clutch is in any one of these three positions.

Figure 15:
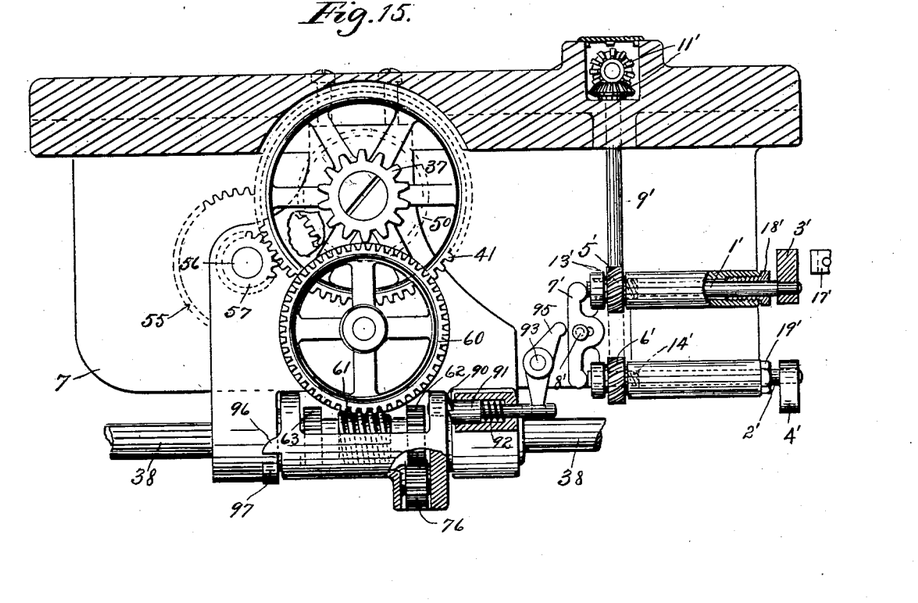
Fig. 15, a view of a part of the driving mechanism of the carriage and the levers by which the worm is thrown out of contact with its worm-gear, as seen from the rear of the apron.
Figure 16:
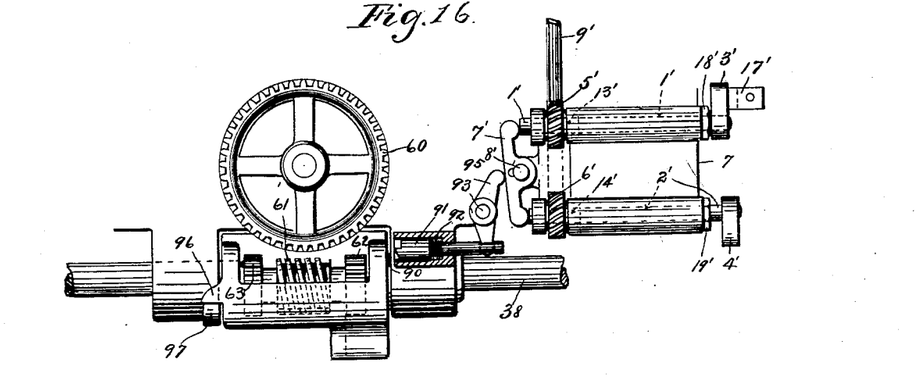
Fig. 16, a view of the same parts, showing their relative positions when the worm is out of contact with its worm-gear and the feed mechanism inoperative.

The rocker-bracket 69, Figs. 15 and 16, is held in working position—that is, with the worm 61 in contact with worm-gear 60—by means of a lug 90, which rests upon the flat surface of a spring-pin 91, forced forward by a coiled spring 92.

Figure 14:
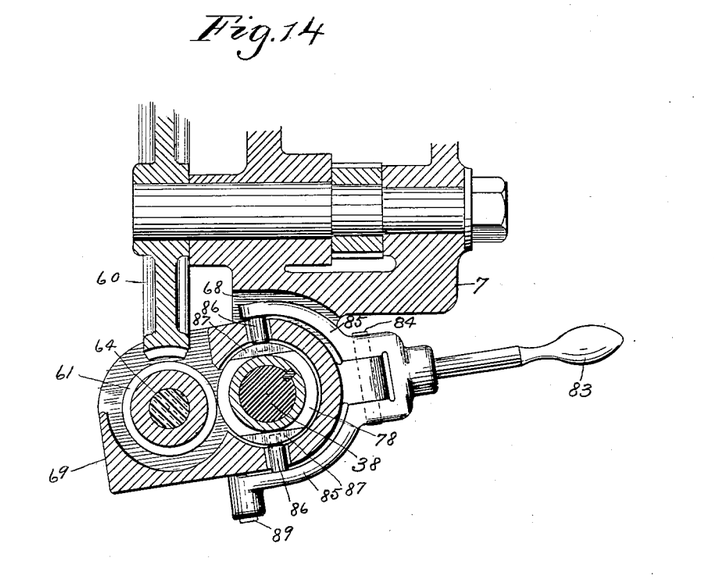
Fig. 14, a section through the line Z Z of Fig. 11, showing the relative position of the parts when the worm is dropped out of mesh with the worm-gear.

93 is a revoluble stud mounted in the apron, having keyed to its outer end without the apron a handle 94, Fig. 6, and to its inner end within the apron a two-armed lever 95, one arm of which projects into a slot of spring-pin 91. By turning said handle to the right the spring-pin is withdrawn from contact with lug 90, thereby causing the rocker-bracket to drop until a second lug 96 rests upon a lug 97 of the apron and the worm 61 to become disengaged from its worm-gear 60. In order to throw the worm again into contact with its gear, the operator has but to press down upon the handle 83, Fig. 14, which will cause the beveled edge of lug 90 to strike upon the beveled edge of spring-pin 91, and thus force it back sufficiently far to allow the lug to pass, when the pin will spring into position and securely relock the rocker-bracket in working position. A slight revolution, therefore, of the handle 83 in the vertical plane will throw the worm and worm-gear in or out of contact, and a slight revolution of the same handle in the horizontal plane, when said worm and gear are in contact, will cause the carriage to travel to the right or left or to become stationary.

An automatic method of throwing the handle 94, and thereby tripping the feed at as many different points on the forward travel of the carriage as there are tools in the turret-head, is obtained by the following mechanism:

1′ and 2′, Figs. 15 and 16, are parallel rods mounted revolubly in the apron and free to move lengthwise therein. Secured to the outer ends of said rods are fingers 3′ and 4′, and keyed to their inner ends are spiral gears 5′ and 6′.

Figures 4, 5:
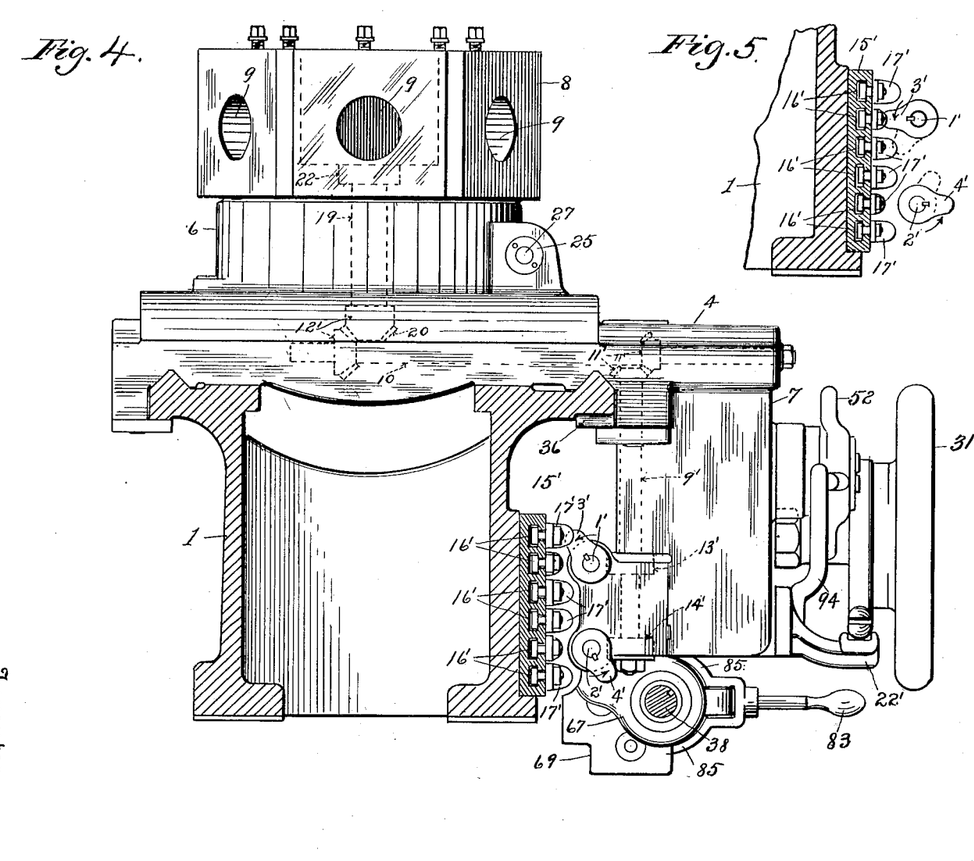
Fig. 4, an end view of Fig. 2.
Fig. 5, a detailed view showing some of the relative positions successively assumed by the revolving stop-fingers.

7′ is a lever supported by and free to move longitudinally upon a pin 8′, with projections directly opposite and in contact with said rods. Resting against the center of said lever is the upper arm of lever 95. The spring 92 of pin 91, acting through the latter lever 95, tends at all times to hold lever 7′ in a perpendicular position and the rods 1′ and 2′, and consequently the fingers 3′ and 4′, forward, as shown in Fig. 15. Said fingers are keyed to their respective rods so as to stand at an angle of one hundred and eighty degrees to each other, Fig. 4, and they are geared to and made to revolve synchronously with the turret-head by means of the shafts 9′ and 10′, Fig. 6, the miter-gears 11′ 11′ and 12′ 12′, and the spiral gears 5′ 13′ 6′ and 14′. Each finger, therefore, will be successively revolved and locked, like the turret-tools, into six positions sixty degrees apart. They are so arranged with reference to the turret that during the cutting operation of the first tool the upper finger 3' points toward the bed at an inclination of sixty degrees and the lower finger 4' in a diametrically opposite direction. As the second and third tools are revolved into operative position the upper finger will successively point directly toward the bed and at a dip of sixty degrees to the bed, Fig. 5. As the three remaining tools are revolved into operative position the upper finger will swing to the right and the lower finger to the left of the perpendicular passing through their center, and the lower finger will successively take positions relative to the bed similar to those previously taken by the upper finger. On the side of the bed is fastened a plate 15', Figs. 4 and 6, provided with as many longitudinal T-slots 16' as there are tool-holding apertures in the turret, in each of which slides an angle-dog 17'. Said dogs may be clamped by means of T-bolts and nuts at any desired point in their respective slots, and, counting from the top, they will project into the successive paths of travel of the fingers 3' and 4' when said fingers point toward the bed.

If the carriage is fed forward under power-feed with the upper finger 3' pointing toward the bed, the impingement of the finger upon any one of the upper three dogs 17' will cause the rod 1' to be held against further travel, and the continued forward movement of the carriage will cause lever 7' to revolve on its lower projection as a center, which will force the lever 95 to revolve in turn on its center and withdraw the spring-pin 91, Fig. 16. The worm 61 thereupon drops out of contact with worm-gear 60 and the carriage becomes stationary. If during the forward motion of the carriage the lower finger 4' points toward the bed, the impingement of the finger upon any one of the lower three dogs will cause rod 2' to be held against further travel, and the continued forward movement of the carriage will cause lever 7' to revolve on its upper projection as a center, which will likewise cause lever 95 to revolve and produce the same effect as before—namely, trip the feed.

After the power-feed is automatically thrown out the operator feeds the carriage forward by the hand-wheel until the fingers 3' or 4', depending, of course, upon which is in use, strikes its corresponding hexagonal-headed bushing 18' or 19', which securely locks the carriage against further forward motion. Said bushings are tapped into the apron, and the distance the turret-tools may cut after the power-feed is thrown out may therefore be regulated by screwing said bushings in or out. Each turret-tool is thus provided with an independent stop, which may be clamped at any desired position on the side of the bed, and the operator may so arrange them with reference to the length of cut required of each tool that as the tools are successively fed forward and the predetermined cut of each is all but completed the carriage-feed will be thrown out automatically, leaving the carriage to be brought up to the dead stop by the operator through a fractional revolution of the carriage hand-wheel.

Figures 17, 18:
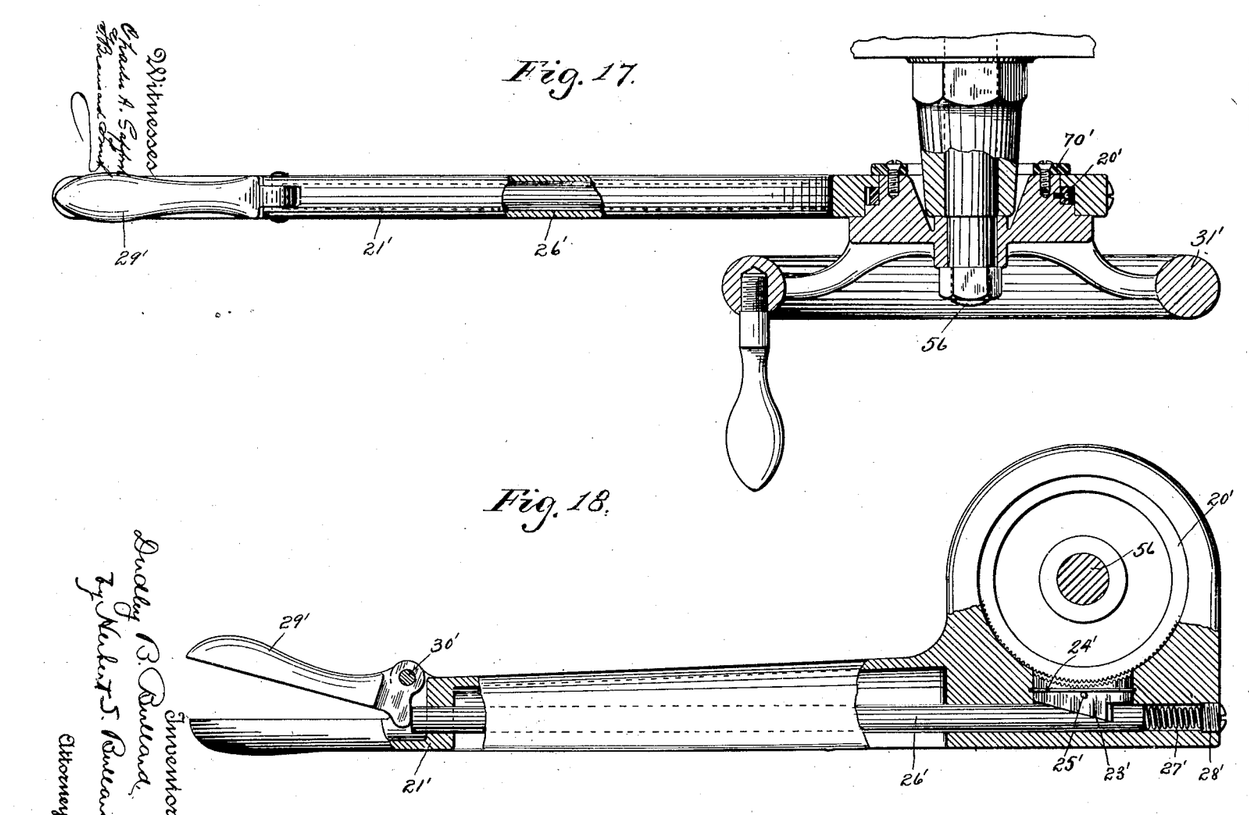
Fig. 17, a plan view of the hand-lever encircling the hand-wheel of the carriage, by means of which the operator may secure additional leverage upon the hand-wheel, and thereby easily feed the carriage, and consequently the turret-tool, either forward or backward while cutting.
Fig. 18, a side view of the same with parts so sectioned as to show the method by which the lever may be locked to the hub of the hand-wheel.

Figs. 17 and 18 show my improved method of securing an increased leverage upon the hand-wheel when the cutting-tool is to be fed forward by hand-power. 20' is a serrated ring securely attached to the hub of the hand-wheel. Swiveled upon said hub and in such a manner as to incase said ring is a long lever-arm 21, which is held in place on the hub by a ring 70', securely screwed thereto and maintained in its horizontal position by a bracket 22', Fig. 4. 23' is a steel block, serrated on its upper surface, tapered on its lower surface, and susceptible of perpendicular movement in said lever. A flat spring 24', the ends of which are fastened to the lever-arm and the center of which rests upon a pin 25', inserted in the steel block, tends to keep said block from interlocking, by means of its serrations, with steel ring 20'. Said block rests upon the tapered surface of a slide-rod 26', inserted within the lever-arm 21'. Pressing against the right-hand end of the rod and held in position by a screw 28' is a coiled spring 27', which tends to force the rod to the left, thereby permitting spring 24' to force steel block 23' downward out of contact with ring 20'. On the left-hand end of the rod rests the nub of a split handle 29', which swivels on a pin 30'. In order to interlock the lever-arm and the hand-wheel, the operator has but to grasp both the handle end of the lever-arm and the split handle 29', which causes the latter to revolve upon pin 30' and to force, by means of its nub, rod 26' to the right, and the latter by virtue of its inclined surface raises serrated block 23' into contact with serrated ring 20'. It is evident that the greater the pressure exerted upon the split handle the more securely is the lever-arm gripped to the hand-wheel shaft. The lever therefore affords the operator an opportunity to acquire a greater leverage upon the hand-wheel shaft than the hand-wheel itself offers and renders the feeding of the turret-tools by hand just so much easier. Releasing the pressure on split handle 29' will at once release the block 23' and ring 20' and permit the operator to raise or lower the lever-arm, depending upon the direction in which he is feeding, preparatory to taking a new grip upon the hub of the hand-wheel. A special feature of the arrangement is the ease with which the parts may be adjusted after they are assembled, a turn of the screws 28' raising or lowering the serrated block 23', and thereby bringing it into proper adjustment with serrated ring 20'.

Having thus described my invention, what I claim is—

1. In a turret-lathe the combination of a carriage-block; a reciprocating slide-bar provided with rack-teeth; a lever, one arm of which is a segmental gear in mesh with the rack on said slide-bar and the other arm of which is an operative handle; a spring-actuated lock-pin within said carriage-block; and connecting means, provided with means for securing lost motion, between said slide-bar and said lock-pin, whereby as the slide-bar is continuously moved in one direction, first, said connecting means will depress said lock-pin; second, said means of lost motion will retain said lock-pin depressed, and, third, said connecting means will finally release said lock-pin, and whereby as the slide-bar is moved in the opposite direction said connecting means will be restored to their original position.

2. In a turret-lathe the combination of a carriage-block; a spring-actuated lock-pin; a two-part bell-crank, one arm of which is connected to the lock-pin and the other arm of which is free, and both arms of which are so arranged relative to each other that the free arm may be revolved in one direction independently of the lock-pin arm, but if revolved in the opposite direction it will lock with and transmit its motion to the lock-pin arm; a lever swiveled in said carriage-block; and a reciprocating cam, provided with a lost-motion surface, opposite the free arm of said two-part bell-crank and operated by said lever, whereby as said lever is turned in one direction said cam will, first, impinge upon and revolve said free arm, thereby causing it to interlock with the lock-pin arm and hence depress the lock-pin; second, the lost-motion surface of said cam will retain said free arm in its new position and the lock-pin depressed, and, finally, said cam will pass beyond said free arm, thereby permitting it and the lock-pin to assume their normal positions, and as said lever is turned in the opposite direction said cam will revolve said free arm in the non-operative direction sufficiently far to allow said cam to pass it, when said arm will assume its normal position.

3. In a turret-lathe the combination of a carriage-block; a turret provided with a plurality of locking-recesses; a spring-actuated lock-pin; a two-part bell-crank, one arm of which is connected to the lock-pin and the other arm of which is free, and both arms of which are so arranged relative to each other that the free arm may be revolved in one direction independently of the lock-pin arm, but if revolved in the opposite direction it will lock with and transmit its motion to the lock-pin arm; a slide-bar shaped substantially as shown whereby as it is moved toward the free arm of the two-part bell-crank it will, first, impinge upon and cause said free arm to interlock with the lock-pin arm and thereby depress the lock-pin; second, it will retain the two arms of the two-part bell-crank interlocked and the lock-pin depressed, and, finally, it will release the free arm and thereby allow the lock-pin to spring upward and assume its normal position, and as it is moved in the reverse direction it will revolve the free arm in the non-operative direction sufficiently far to allow the slide-bar to pass, when the free arm will assume its normal position; and means for reciprocating said slide-bar.

4. In a turret-lathe the combination of a carriage-block; a turret provided with a plurality of locking-recesses; a lock-pin; a two-part bell-crank, one arm of which is actuated by a spring and connected to the lock-pin, and the other arm of which is free, and both arms of which are so designed that a tooth of one projects into a recess of the other, said recess being so placed and so proportioned relative to said tooth that the loose arm may have a limited rotation in one direction without locking with the other arm, but if rotated in the opposite direction it will immediately lock with and transmit its motion to the lock-pin arm; a slide-bar shaped substantially as shown whereby as it is moved toward the free arm of the two-part bell-crank it will, first, impinge upon and cause said free arm to interlock with the lock-pin arm and thereby depress the lock-pin; second, it will retain the two arms of the two-part bell-crank interlocked and the lock-pin depressed, and, finally, it will release the free arm and thereby allow the lock-pin to spring upward and assume its normal position, and as it is moved in the reverse direction it will revolve the free arm in the non-operative direction sufficiently far to allow the slide-bar to pass, when the free arm will assume its normal position; and means for reciprocating said slide-bar.

5. In a turret-machine in combination a carriage-block; a tapered lock-pin 23; a slide-bar having a flat surface 34 and a recess 35; a two-part bell-crank swiveled at right angles to the lock-pin one arm of which 29 is connected to the lock-pin and actuated by a spring and the other arm of which 30 projects into the path of travel of the slide-bar, and both of which are interlocked by means of a tooth 31 and a recess 32; a lever 17; and connecting means between the lever 17 and the slide-bar for operating said bar.

6. In a turret-lathe the combination of a carriage-block; a revoluble turret-head having tapered recesses 24; a tapered lock-pin 23 adapted to enter said recesses; a slide-bar having a flat surface 34, a recess 35, and rack-teeth cut thereon; a two-part bell-crank swiveled at right angles to the lock-pin one arm of which 29 is connected to the lock-pin and actuated by a spring and the other arm of which 30 projects into the path of travel of the slide-bar, and both of which are interlocked by means of a tooth 31 and a recess 32; and a lever swiveled in said block, one arm of which, in the form of a segment-gear, meshes with the rack-teeth cut on said slide-bar and the other arm of which is an operative handle.

7. In a turret-lathe the combination of a turret revolubly mounted on a carriage-block;

a hollow binding-screw entering a nut in the carriage-block on the same axis as that on which the turret revolves; connecting means between the turret and binding-screw, whereby the travel of the binding-screw into or out of said nut will free said turret from or bind said turret to the carriage-block; a two-armed lever swiveled on said carriage-block, one arm of which is an operative handle; and gearing connecting the hollow binding-screw and the other arm of said lever.

8. In a turret-machine, in combination, a carriage-block provided with an internal screw; a turret revolubly mounted on said carriage-block on the axis of the internal screw; a hollow binding-screw, provided with a segment-gear, entering said internal screw; a lever swiveled in said carriage-block, one arm of which is in the form of a segment-gear and the other arm of which is an operative handle; and connecting means between the segment-gear of the hollow binding-screw and the segment-gear of the lever.

9. In a turret-lathe, in combination, a carriage-block provided with an internal screw; a turret revolubly mounted on said carriage-block on the axis of the internal screw; a hollow binding-screw within said internal screw; a shouldered binding-bolt 19 within said hollow binding-screw; a two-armed lever swiveled on said carriage-block, one arm of which is an operative handle; and gearing connecting the hollow binding-screw and the other arm of said lever.

10. In a turret-lathe the combination of a carriage-block provided with an internal screw; a revoluble turret, provided with a plurality of locking-recesses, mounted upon said block on the same axis as said internal screw; an external screw within said internal screw; a spring-actuated lock-pin susceptible of successively entering said locking-recesses; connecting means between said external screw and said turret, and between said external screw and said lock-pin, whereby a partial revolution of the external screw in the direction causing it to enter the internal screw will cause said turret to become unclamped and the lock-pin to be successively depressed below the surface of said turret, retained in its depressed position below the surface of and out of contact with said turret and finally released, thereby permitting it to spring upward against the surface, or into a locking-recess, of said turret, and a reverse revolution of the external screw will cause said turret to become reclamped; and means for revolving said external screw.

11. In a turret-lathe the combination of a turret provided with recesses and revolubly mounted on a carriage-block having an internal screw on the same axis as that on which the turret revolves; a hollow binding-screw within said internal screw; connecting means between the turret and the binding-screw whereby as the binding-screw is unscrewed from the internal screw the turret will be securely clamped to the carriage-block, and as the binding-screw is screwed into the internal screw the turret will be released; a lock-pin, actuated by a spring, projecting into one of said recesses of the turret; and connecting means between said binding-screw and said lock-pin whereby as the binding-screw is made to enter the internal screw, and thereby unclamp the turret, the lock-pin will be made to withdraw from the recess of the turret, thereby unlocking it and permitting its revolution.

12. In a turret-lathe the combination of a carriage-block provided with an internal screw; a revoluble turret provided with a plurality of locking-recesses mounted upon said carriage-block on the same axis as said internal screw; an external screw, provided with a segmental gear, within said internal screw; connecting means between said external screw and said turret whereby as said external screw recedes from said internal screw said turret will be clamped against revolving, and as said external screw enters said internal screw said turret will be unclamped; a spring-actuated lock-pin susceptible of successively entering said recesses of the turret; a double-rack slide-bar substantially of the form shown having one of its racks in mesh with the segmental gear of the hollow external screw; a two-part bell-crank, interlocked as shown, one arm of which is connected to the lock-pin and the other arm of which projects into the path of travel of the slide-bar; and a lever swiveled in the carriage-block, one arm of which, in the form of a segment-gear, meshes with the second rack of the slide-bar and the other arm of which forms a handle whereby the slide-bar may be moved forward.

13. In combination a revoluble turret 8 provided with recesses 24, 24; a carriage-block 6 provided with a turret-seat and a nut 11; a hollow binding-screw 13 provided with a segmental gear 14; a double-shouldered bolt 19; a lock-pin 23; a double-rack slide-bar 18 having a flat surface 34 and a depression 35; a two-part bell-crank, one arm of which 29 is connected to the lock-pin and the other arm of which 30 projects into the path of travel of the slide-bar, and both of which are interlocked by means of a tooth 31 and a recess 32; and a lever 17, one arm of which, in the form of a segment-gear, meshes with the rack on the slide-bar and the other arm of which forms a handle, whereby the rack may be moved forward, thereby causing the hollow external screw to enter the internal screw of the carriage-block and the lock-pin to be successively depressed, retained in its depressed position, and released, and whereby the slide-bar may subsequently be moved backward, thereby causing said external screw to recede from the internal screw, and the pendent arm of the two-part bell-crank to swing free of the slide-bar and regain its normal position.

14. In combination a lever-arm provided with a cylindrical bearing; a hand-lever swiveled on said arm; a spring friction-block provided with an inclined surface mounted in said lever-arm and susceptible of being moved radially toward the center of said cylindrical bearing; and connecting means between said hand-lever and the inclined surface of said friction-block, whereby a movement of the hand-lever will move said friction-block toward the center of the cylindrical bearing.

15. In combination a hand-wheel provided with a serrated hub; a lever-arm swiveled on said hub in the bearing end of which is a serrated block susceptible of being moved toward and made to interlock with the serrated hub, and on the outer end of which is a hand-lever; and connecting means between said hand-lever and said serrated block whereby a pressure on the hand-lever will cause the serrated block and serrated hub to interlock.

16. In combination a hand-wheel on the hub of which is a serrated ring; a lever-arm swiveled on said hub and incasing said serrated ring; a serrated block, with an inclined plane, mounted in said lever-arm and adapted to be moved radially toward and made to interlock with the serrated ring, and held in normal position out of contact with said serrated ring by means of a spring; a spring slide-rod, provided with an inclined plane, inserted in said lever-arm and passing beneath said serrated block, the inclined faces being opposite each other; and a hand-lever swiveled on said lever-arm, a nub of which rests upon the end of said slide-rod, and by a depression of which the inclined plane of the rod will be forced beneath the serrated block, thereby causing said serrated block to rise and interlock with the serrated ring on the hub of the hand-wheel.

17. In combination a lever-arm provided with a cylindrical bearing; a rod, susceptible of movement lengthwise, within said arm; a hand-lever, provided with nub resting against said rod, swiveled on said arm; a friction-block provided with an inclined surface mounted in said lever-arm and susceptible of being moved radially toward the center of said cylindrical bearing; means of connection between said rod and the inclined surface of said block whereby as the hand-lever is depressed the friction-block will be moved toward the center of the cylindrical bearing; and means for returning the parts to their normal position when the hand-lever is released.

18. In combination a lever-arm with a cylindrical bearing; a spring slide-rod in said arm, one end of which rests against the nub of a hand-lever swiveled in said lever-arm, and the other end of which is provided with an inclined plane; a serrated slide-block resting on the inclined plane of said rod, and adapted by means of the slide-bar when actuated by the hand-lever, to be moved radially toward the center of the cylindrical bearing of the lever-arm; and a spring for holding said serrated block in its normal position.

19. In a turret-lathe in combination a turret, with tool-holding apertures, revolubly mounted on a carriage; a pair of horizontal, revoluble and parallel slide-rods mounted in said carriage and provided with fingers set at an angle of one hundred and eighty degrees to each other; a set of independent stops, corresponding in number to the tool-holding aperture of the turret, adjustable lengthwise on the bed; and connecting means between the turret and the slide-rods whereby the latter may be revolved synchronously with the turret and the first finger revolved and locked opposite one half of the stops and the second finger revolved and locked opposite the other half of the stops.

20. In a turret-lathe in combination a turret, with tool-holding apertures, revolubly mounted on a reciprocating carriage; a pair of horizontal, revoluble and parallel spring-actuated slide-rods mounted in an apron of said carriage and provided with fingers set at an angle of one hundred and eighty degrees to each other; an adjustment-screw between the carriage and each finger; a set of horizontal parallel slots, corresponding in number to the tool-holding apertures of the turret, placed on the side of the bed, in each of which is an adjustable stop; a horizontal rod in said carriage and a perpendicular rod in said apron, the former being connected to the turret and the perpendicular rod by forty-five degrees miter-gearing, and the latter being connected to the parallel spring slide-rod by forty-five degrees spiral gearing, by means of which connections said slide-rods are revolved synchronously with the turret, and the upper finger revolved and locked opposite one half of the stops and the lower finger revolved and locked opposite the other half of the stops.

21. In a turret-lathe, in combination, a bed provided with independent stops adjustably arranged thereon; a reciprocating carriage; a pair of revoluble and parallel rods mounted in said carriage and provided with fingers, set at an angle of one hundred and eighty degrees to each other, adapted to be revolved opposite said stops; and means for revolving said rods synchronously.

22. In a turret-lathe, in combination, a bed provided with independent stops adjustably arranged thereon; a reciprocating carriage; a pair of horizontal, revoluble and parallel spring-actuated slide-rods mounted in said carriage and provided with fingers, set at an angle of one hundred and eighty degrees to each other, adapted to be revolved opposite said stops; an adjustment-screw between the carriage and each finger; and means for revolving said slide-rods synchronously.

23. In a turret-lathe in combination a turret, with tool-holding apertures, revolubly mounted on a carriage; a feed mechanism for moving said carriage lengthwise on its bed;

a pair of horizontal revoluble and parallel slide-rods mounted in said carriage and provided with fingers set at an angle of one hundred and eighty degrees to each other; a set of independent stops, corresponding in number to the tool-holding apertures of the turret, adjustable lengthwise on the bed; connecting means between the turret and the slide-rods whereby the latter may be revolved synchronously with the turret and the first finger revolved and locked opposite one half of said stops and the second finger revolved and locked opposite the other half of said stops; and connecting means between the feed mechanism of the carriage and said parallel rods whereby a movement in its bearings of either rod due to the impingement of its finger upon any one of the stops opposite said finger will throw said feed mechanism out of action.

24. In a turret-lathe in combination a bed; a carriage, movable lengthwise on said bed, supporting a revoluble turret provided with tool-holding apertures; a worm and worm-gear feed mechanism for moving said carriage, said worm being so mounted that it may be thrown in and out of mesh with its worm-gear; a pair of horizontal, revoluble and parallel spring-actuated slide-rods mounted in said carriage and provided with fingers set at an angle of one hundred and eighty degrees to each other; a set of independent stops, corresponding in number to the tool-holding apertures of the turret, adjustable lengthwise on the bed; connecting means between the turret and the slide-rods whereby the latter may be revolved synchronously with the turret, and the first finger revolved and locked opposite one half of said stops, and the second finger revolved and locked opposite the other half of said stops; and connecting means between the parallel slide-bars and the mountings of the worm, when the worm and worm-gear are in contact, whereby a movement in its bearings of either rod due to the impingement of its finger upon any one of the stops opposite said finger will throw said worm out of contact with its worm-gear.

25. In combination with a worm-gear and a splined feed-rod, each of which is supported by a movable carriage, a handled rocker-bracket, adapted to move with the carriage, swiveled upon the feed-rod and so designed as to have but a limited rotation; a worm mounted in said bracket, and adapted by the rocking of the bracket to be thrown in and out of mesh with the worm-gear; spur-gear connections between said worm and said feed-rod; a spring catch-pin so designed relative to the rocker-bracket as to permit the worm to be raised and locked in mesh with the worm-gear; a pair of horizontal, revoluble and parallel spring-actuated slide-rods mounted in said carriage and provided with fingers set an angle of one hundred and eighty degrees to each other; an adjustment-screw opposite each finger; a rod at right angles to said parallel rods, provided with spiral gears meshing with spiral gears of the same diameter on said slide-rods, whereby said slide-rods may be made to revolve synchronously with the right-angle rod; a lever 7' provided with a slot swiveled on a pin 8' midway between said slide-bars, one arm of which bears on the end of one of the slide-rods, and the other arm of which bears on the end of the other slide-rod; and a lever 95, with one arm resting against the center of lever 7' and the other arm attached to the spring catch-pin 91, keyed to a short stud 93 supporting a hand-lever 94, all so arranged that a turn of the hand-lever, or a lengthwise movement of either slide-rod, in a certain direction will draw the catch-pin and cause the worm, if in mesh with the worm-gear, to drop out of mesh.

26. In combination, a carriage supporting a worm-gear; a feed-rod; a rocker-bracket, supporting a worm adapted to be thrown in or out of mesh with said worm-gear, swiveled on said feed-rod; a spur-gear on each end of said worm; loose spur-gears on said feed-rod, one of which meshes with one of the gears of the worm and the other of which meshes with an intermediate gear placed between it and the other gear of the worm; means for connecting either of said loose spur-gears to said feed-rod and thereby causing it to revolve with and transmit the motion of said feed-rod; and means for revolving the rocker-bracket and thereby throwing the worm into or out of mesh with the worm-gear.

27. In combination, a carriage provided with bearings and supporting a worm-gear; a rocker-bracket, supporting a worm adapted to be thrown in or out of mesh with said worm-gear, swiveled in said bearings; a spur-gear on each end of said worm; a splined feed-rod passing through the trunnions of said rocker-bracket; loose spur-gears on said feed-rod, one of which meshes with one of the gears of the worm and the other of which meshes with an intermediate gear placed between it and the other gear of the worm; a sliding bushing keyed to said feed-rod; means of connection between said bushing and said loose spur-gears, whereby as the bushing is moved from its normal position, either to the right or the left, it will cause one of said loose spur-gears to revolve with, and transmit the motion of, said feed-rod; and means for sliding said bushing, and for raising or lowering said swivel-bracket, thereby throwing the worm in or out of mesh with the worm-gear.

28. In combination, a carriage provided with bearings supporting a worm-gear; a rocker-bracket, supporting a worm adapted to be thrown in or out of mesh with said worm-gear, swiveled in said bearings; a spur-gear on each end of said worm; a splined feed-rod passing through the trunnions of said rocker-bracket; loose spur-gears on said feed-rod, one of which meshes with one of the gears of the worm and the other of which meshes with an intermediate gear placed between it and the other gear of the worm, and each of which is provided with clutch-teeth on its opposing ends; a grooved clutch-sleeve keyed to and movable lengthwise on said feed-rod between said spur-gears, with clutch-teeth on each end designed to mesh with those on said spur-gears; means whereby said clutch-sleeve may be retained in its normal position midway between said loose gears and whereby it may be moved to the right or left into contact with one of said loose gears; and means for revolving said rocker-bracket and thus throwing the worm into or out of contact with said worm-gear.

29. In combination a carriage supporting a worm-gear and provided with bearings; a rocker-bracket swiveled in said bearings, and supporting a worm adapted to mesh with said worm-gear and at each end of which is a spur-gear; a splined feed-rod movable lengthwise through the trunnions of said rocker-bracket; loose spur-gears on said feed-rod, one of which meshes with one of the gears of the worm and the other of which meshes with an intermediate gear placed between it and the other gear of the worm, and each of which is provided with clutch-teeth on its opposing ends; a grooved clutch-sleeve keyed to and movable lengthwise on said feed-rod between said spur-gears, with clutch-teeth on each end designed to mesh with those on said spur-gears; a two-forked lever-arm, with pins projecting from each fork through slots of the rocker-bracket into the groove of said clutch-sleeve, swiveled upon the rocker-bracket on an axis at right angles to the feed-rod, whereby the handle may be turned on said axis in the plane of the feed-rod, and the clutch-sleeve shifted from one gear to the other, or midway between them, and may also be turned in a plane at right angle to the feed-rod, and the worm thrown in or out of mesh with the worm-gear.

30. In combination a rocker-bracket 69 swiveled by means of trunnions 65, 66 in the bearings 67, 68 of a carriage; spur-gears 70, 71 with sleeves 72, 73 revolubly mounted in said trunnions and held against movement lengthwise by collars 74, 75, on the inner face of each of which are cut clutch-teeth 81, 82; a splined feed-shaft passing through said gears and sleeve, to which is keyed a clutch-sleeve 78 provided with a groove 88 and clutch-teeth 79, 80 on its end faces; a stud inserted in said rocker-bracket on which revolves a worm-gear 61 provided at each end with spur-gears 62, 63, the latter of which meshes with spur 70 of the feed-rod and the first of which is connected to spur-gear 71 of the feed-rod by an intermediate gear 76 revolving on a stud 77 inserted in said rocker-bracket; a lever provided with handle 83 and forks 85 swiveled on a pin 84 at right angles to axis of the feed-shaft, each fork of which is provided with a pin 86 projecting into the groove 88 of the clutch-sleeve; connecting means between said lever and said rocker-bracket whereby said lever-handle may be held in either a central position, with the clutch-sleeve out of contact, or to the left or right with the clutch-sleeve in contact with the spur-gears; and a spring trip-pin 91 with a flat tapered projection, bedded in the carriage, designed to support the rocker-bracket by means of its being made to project under tapered lug 90 of said bracket.

DUDLEY B. BULLARD.

Witnesses:
G. N. MOREHOUSE,
I. D. McLEOD.